(12) United States Patent
Sinha et al.

(10) Patent No.: US 12,166,661 B2
(45) Date of Patent: Dec. 10, 2024

(54) DNS-BASED GSLB-AWARE SD-WAN FOR LOW LATENCY SaaS APPLICATIONS

(71) Applicant: VMware LLC, Palo Alto, CA (US)

(72) Inventors: Ankit Kumar Sinha, Bengaluru (IN); Navaneeth Krishnan Ramaswamy, Chennai (IN); Balaji Shanmugam, Bengaluru (IN); Sasikumar Balasubramanian, Chennai (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/211,578

(22) Filed: Jun. 19, 2023

(65) Prior Publication Data

US 2024/0022499 A1    Jan. 18, 2024

(30) Foreign Application Priority Data

Jul. 18, 2022 (IN) .............................. 202241040923
Jul. 18, 2022 (IN) .............................. 202241040926

(51) Int. Cl.
*H04L 45/12* (2022.01)
*H04L 43/0864* (2022.01)
(Continued)

(52) U.S. Cl.
CPC ........ *H04L 45/123* (2013.01); *H04L 43/0864* (2013.01); *H04L 43/10* (2013.01);
(Continued)

(58) Field of Classification Search
CPC ... H04L 45/123; H04L 61/4511; H04L 67/10; H04L 67/28; H04L 67/141; H04W 40/28
(Continued)

(56) References Cited

U.S. PATENT DOCUMENTS

| 5,652,751 A | 7/1997 | Sharony |
| 5,909,553 A | 6/1999 | Campbell et al. |

(Continued)

FOREIGN PATENT DOCUMENTS

| CN | 1926809 A | 3/2007 |
| CN | 102577270 A | 7/2012 |

(Continued)

OTHER PUBLICATIONS

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

(Continued)

*Primary Examiner* — Glenford J Madamba
(74) *Attorney, Agent, or Firm* — Quarles & Brady LLP

(57) ABSTRACT

Some embodiments of the invention provide a method of sending data messages from an edge router at a first location of an enterprise network to a SaaS (software as a service) application server provided by a third-party at a second location. The method receives, from a DNS (domain name system) first server, a resolution for a particular destination network address for the SaaS application server at the second location. From a second server, the method obtains an identifier for a first cloud gateway from multiple cloud gateways at multiple locations through which the particular destination address for the SaaS application server can be reached, the first cloud gateway farther from the first location than a second cloud gateway in the multiple cloud gateways but closer to the second location than the second cloud gateway. The method uses an optimized SD-WAN connection to the first cloud gateway to forward data messages for the first cloud gateway to the SaaS application at the second location.

20 Claims, 9 Drawing Sheets

(51) Int. Cl.
*H04L 43/10* (2022.01)
*H04L 61/4511* (2022.01)
*H04L 67/1004* (2022.01)
*H04L 67/53* (2022.01)
*H04W 40/28* (2009.01)

(52) U.S. Cl.
CPC ...... *H04L 61/4511* (2022.05); *H04L 67/1004* (2013.01); *H04L 67/53* (2022.05); *H04W 40/28* (2013.01)

(58) Field of Classification Search
USPC ........................................................ 709/235
See application file for complete search history.

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,751,409 B1 | 7/2010 | Carolan |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,516,129 B1 | 8/2013 | Skene |
| 8,566,452 B1 | 10/2013 | Goodwin, III et al. |
| 8,588,066 B2 | 11/2013 | Goel et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,015,299 B1 | 4/2015 | Shah |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson, III et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,542,219 B1 | 1/2017 | Bryant et al. |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,692,714 B1 | 6/2017 | Nair et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,923,826 B2 | 3/2018 | Murgia |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B1 | 1/2019 | Appleby et al. |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |

(56) References Cited

U.S. PATENT DOCUMENTS

| | | |
|---|---|---|
| 10,567,519 B1 | 2/2020 | Mukhopadhyaya et al. |
| 10,574,482 B2 | 2/2020 | Oré et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,630,505 B2 | 4/2020 | Rubenstein et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,708,144 B2 | 7/2020 | Mohan et al. |
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,595 B2 | 8/2021 | Knutsen et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,146,632 B2 | 10/2021 | Rubenstein |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 | 9/2022 | Ramaswamy et al. |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,522,780 B1 | 12/2022 | Wallace et al. |
| 11,526,434 B1 | 12/2022 | Brooker et al. |
| 11,533,248 B2 | 12/2022 | Mayya et al. |
| 11,552,874 B1 | 1/2023 | Pragada et al. |
| 11,575,591 B2 | 2/2023 | Ramaswamy et al. |
| 11,575,600 B2 | 2/2023 | Markuze et al. |
| 11,582,144 B2 | 2/2023 | Ramaswamy et al. |
| 11,582,298 B2 | 2/2023 | Hood et al. |
| 11,601,356 B2 | 3/2023 | Gandhi et al. |
| 11,606,225 B2 | 3/2023 | Cidon et al. |
| 11,606,286 B2 | 3/2023 | Michael et al. |
| 11,606,314 B2 | 3/2023 | Cidon et al. |
| 11,606,712 B2 | 3/2023 | Devadoss et al. |
| 11,611,507 B2 | 3/2023 | Ramaswamy et al. |
| 11,637,768 B2 | 4/2023 | Ramaswamy et al. |
| 11,677,720 B2 | 6/2023 | Mayya et al. |
| 11,689,959 B2 | 6/2023 | Devadoss et al. |
| 11,700,196 B2 | 7/2023 | Michael et al. |
| 11,706,126 B2 | 7/2023 | Silva et al. |
| 11,706,127 B2 | 7/2023 | Michael et al. |
| 11,709,710 B2 | 7/2023 | Markuze et al. |
| 11,716,286 B2 | 8/2023 | Ramaswamy et al. |
| 11,722,925 B2 | 8/2023 | Devadoss et al. |
| 11,729,065 B2 | 8/2023 | Ramaswamy et al. |
| 2002/0049687 A1 | 4/2002 | Helsper et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0186682 A1 | 12/2002 | Kawano et al. |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0034335 A1 | 2/2006 | Karaoguz et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2006/0195605 A1 | 8/2006 | Sundarrajan et al. |
| 2006/0245414 A1 | 11/2006 | Susai et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |

(56) References Cited

U.S. PATENT DOCUMENTS

| | | |
|---|---|---|
| 2007/0162639 A1 | 7/2007 | Chu et al. |
| 2007/0177511 A1 | 8/2007 | Das et al. |
| 2007/0195797 A1 | 8/2007 | Patel et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Mai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |

(56) References Cited

U.S. PATENT DOCUMENTS

| | | |
|---|---|---|
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |

(56) References Cited

U.S. PATENT DOCUMENTS

| | | |
|---|---|---|
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317945 A1 | 11/2017 | Guo et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |

(56) References Cited

U.S. PATENT DOCUMENTS

| | | |
|---|---|---|
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1* | 5/2019 | Markuze ............... H04L 69/163 |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |

(56) References Cited

U.S. PATENT DOCUMENTS

| | | |
|---|---|---|
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1 | 4/2022 | Hooda et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerstrom et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0105680 A1 | 4/2023 | Simlai et al. |
| 2023/0121871 A1 | 4/2023 | Mayya et al. |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231845 A1 | 7/2023 | Manoharan et al. |
| 2023/0239234 A1 | 7/2023 | Zohar et al. |
| 2023/0261974 A1 | 8/2023 | Ramaswamy et al. |

FOREIGN PATENT DOCUMENTS

| | | |
|---|---|---|
| CN | 102811165 A | 12/2012 |
| CN | 104956329 A | 9/2015 |
| CN | 106230650 A | 12/2016 |
| CN | 106656847 A | 5/2017 |
| CN | 106998284 A | 8/2017 |
| CN | 110447209 A | 11/2019 |
| CN | 111198764 A | 5/2020 |
| EP | 1912381 A1 | 4/2008 |
| EP | 2538637 A2 | 12/2012 |
| EP | 2763362 A1 | 8/2014 |
| EP | 3041178 A1 | 7/2016 |
| EP | 3297211 A1 | 3/2018 |
| EP | 3509256 A1 | 7/2019 |
| EP | 3346650 B1 | 11/2019 |
| JP | 2002368792 A | 12/2002 |
| JP | 2010233126 A | 10/2010 |
| JP | 2014200010 A | 10/2014 |
| JP | 2017059991 A | 3/2017 |
| JP | 2017524290 A | 8/2017 |
| KR | 20170058201 A | 5/2017 |
| RU | 2574350 C2 | 2/2016 |
| WO | 03073701 A1 | 9/2003 |
| WO | 2005071861 A1 | 8/2005 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2016123314 A1 | 8/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |
| WO | 2021211906 A1 | 10/2021 |
| WO | 2022005607 A1 | 1/2022 |

(56) References Cited

FOREIGN PATENT DOCUMENTS

| | | |
|---|---|---|
| WO | 2022082680 A1 | 4/2022 |
| WO | 2022154850 A1 | 7/2022 |
| WO | 2022159156 A1 | 7/2022 |
| WO | 2022231668 A1 | 11/2022 |
| WO | 2022235303 A1 | 11/2022 |
| WO | 2022265681 A1 | 12/2022 |
| WO | 2023009159 A1 | 2/2023 |

OTHER PUBLICATIONS

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Author Unknown, "VeloCloud Administration Guide: VMware SD-WAN by VeloCloud 3.3," Month Unknown 2019, 366 pages, VMware, Inc., Palo Alto, CA, USA.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

Guo, Xiangyi, et al., (U.S. Appl. No. 62/925,193), filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 17/833,555, filed Jun. 6, 2022, 34 pages, VMware, Inc.

Non-Published Commonly Owned U.S. Appl. No. 17/833,566, filed Jun. 6, 2022, 35 pages, VMware, Inc.

Non-Published Commonly Owned U.S. Appl. No. 17/976,717, filed Oct. 28, 2022, 37 pages, VMware, Inc.

Non-Published Commonly Owned U.S. Appl. No. 18/100,369, filed Jan. 23, 2023, 55 pages, VMware, Inc.

Non-Published Commonly Owned U.S. Appl. No. 18/100,381, filed Jan. 23, 2023, 55 pages, VMware, Inc.

Non-Published Commonly Owned U.S. Appl. No. 18/100,397, filed Jan. 23, 2023, 55 pages, VMware, Inc.

Non-Published Commonly Owned U.S. Appl. No. 18/126,989, filed Mar. 27, 2023, 83 pages, VMware, Inc.

Non-Published Commonly Owned U.S. Appl. No. 18/126,990, filed Mar. 27, 2023, 84 pages, VMware, Inc.

Non-Published Commonly Owned U.S. Appl. No. 18/126,991, filed Mar. 27, 2023, 84 pages, VMware, Inc.

Non-Published Commonly Owned U.S. Appl. No. 18/126,992, filed Mar. 27, 2023, 84 pages, VMware, Inc.

Non-Published Commonly Owned U.S. Appl. No. 18/197,090, filed May 14, 2023, 36 pages, Nicira, Inc.

Non-Published Commonly Owned U.S. Appl. No. 18/208,352, filed Jun. 12, 2023, 69 pages, VMware, Inc.

Non-Published Commonly Owned U.S. Appl. No. 18/208,356, filed Jun. 12, 2023, 69 pages, VMware, Inc.

Non-Published Commonly Owned U.S. Appl. No. 18/208,358, filed Jun. 12, 2023, 69 pages, VMware, Inc.

Non-Published Commonly Owned U.S. Appl. No. 18/211,568, filed Jun. 19, 2023, 37 pages, VMware, Inc.

(56) References Cited

OTHER PUBLICATIONS

Non-Published Commonly Owned Related U.S. Appl. No. 18/211,576 with similar specification, filed Jun. 19, 2023, 37 pages, VMware, Inc.
Non-Published Commonly Owned U.S. Appl. No. 18/222,864, filed Jul. 17, 2023, 350 pages, VMware, Inc.
Non-Published Commonly Owned U.S. Appl. No. 18/222,868, filed Jul. 17, 2023, 22 pages, VMware, Inc.
Non-Published Commonly Owned U.S. Appl. No. 18/224,466, filed Jul. 20, 2023, 56 pages, VMware, Inc.
Non-Published Commonly Owned U.S. Appl. No. 18/235,879, filed Aug. 20, 2023, 173 pages, VMware, Inc.
Non-Published Commonly Owned U.S. Appl. No. 15/803,964, filed Nov. 6, 2017, 15 pages, The Mode Group.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.
Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IEEE, Toronto, ON, Canada.
Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

* cited by examiner

DNS-BASED GSLB-AWARE SD-WAN FOR LOW LATENCY SaaS APPLICATIONS

BACKGROUND

Today, SD-WAN solutions can provide different networking services according to defined business policies, such as the VMware SD-WAN by VeloCloud®. These networking services can include direct internet, internet via a cloud gateway (e.g., VeloCloud® gateway), and internet via private link (e.g., MPLS) backhaul. Typically, the business policy and default policy direct traffic to the internet via a cloud gateway. However, while this approach may direct traffic to a specific cloud gateway based on proximity to the source location, this specific cloud gateway may not be the best gateway for certain publicly hosted applications, such as applications where the specific cloud gateway is unable to meet low latency requirements of the application.

BRIEF SUMMARY

Some embodiments of the invention provide a method of routing data message traffic between an edge router at a branch first location for an enterprise network and a SaaS (software as a service) application server provided by a third-party at a second location. The method is performed, in some embodiments, by the edge router at the branch first location. The method queries a (global server load balancing) GSLB-aware DNS (domain name system) server for a cloud gateway from multiple cloud gateways at multiple locations through which a particular destination network address for the SaaS application server can be reached. From the GSLB-aware DNS server, the method receives an identifier for a first cloud gateway that is farther from the branch first location than a second cloud gateway, but closer to the second location than the second cloud gateway. The method then uses an optimized SD-WAN connection to the first cloud gateway to forward data messages for the first cloud gateway to the SaaS application at the second location.

In some embodiments, each link between the edge router and a cloud gateway is associated with a respective latency score. For instance, a first link between the edge router and the first cloud gateway is associated with a first latency score, in some embodiments, and a second link between the edge router and the second cloud gateway. In some embodiments, after receiving the identifier for the first cloud gateway, the edge router sends requests to the first and second cloud gateways for latency scores associated with the respective links between the first and second cloud gateways and the SaaS application server. In response to the requests, the edge router of some embodiments receives a third latency score from the first cloud gateway associated with a third link between the first cloud gateway and the SaaS application server, and receives a fourth latency score from the second cloud gateway associated with a fourth link between the second cloud gateway and the SaaS application server.

The first latency score associated with the first link between the edge router and the first cloud gateway and the fourth latency score associated with the fourth link between the second cloud gateway and the SaaS application server are high latency scores, in some embodiments. Conversely, in some embodiments, the second latency score associated with the second link between the edge router and the second cloud gateway, and the third latency score associated with the third link between the first cloud gateway and the SaaS application server are low latency scores. In some embodiments, the SaaS application server is associated with a low latency requirement that specifies a maximum latency threshold for the last mile connectivity to the SaaS application (i.e., the unmanaged, unoptimized links from the cloud gateways to the SaaS application server). In some such embodiments, the first cloud gateway is identified as the optimal cloud gateway for reaching the SaaS application server based on a determination that the third latency score meets the low latency requirement (i.e., does not exceed the maximum latency threshold), while the fourth latency score does not meet the low latency requirement (i.e., does exceed the maximum latency threshold).

In some embodiments, the first and second cloud gateways identify the latency scores provided to the edge router by sending probe packets to the SaaS application server. The first and second cloud gateways derive latency measurements from the probe packets to generate the latency scores for the links between the first and second cloud gateways and the SaaS application server, according to some embodiments. The probe packets, in some embodiments, include layer 4 (L4) and layer 7 (L7) probe packets.

In addition to the first cloud gateway being farther from the first location than the second cloud gateway, the first cloud gateway of some embodiments is also associated with a longer (round-trip time) RTT than the second cloud gateway (i.e., due to the increased distance to each the first cloud gateway). In some embodiments, the first cloud gateway is farther from the edge router than the second cloud gateway in terms of physical distance, while in other embodiments, the first cloud gateway is farther from the edge router than the second cloud gateway in terms of signal distance. In still other embodiments, the first cloud gateway is farther from the edge router than the second cloud gateway in terms of both physical distance and signal distance. The edge router of some embodiments determines that the first cloud gateway is farther than the second cloud gateway based on proximity information provided by a server (e.g., the DNS server or a management and control server), while in other embodiments, the edge router makes this determination by performing a proximity operation to determine the distance to each cloud gateway.

In some embodiments, the DNS server is a DNS first server that provides a particular destination network address for the SaaS application server to the edge router, while a second server provides the identifier for the first cloud gateway to the edge router. The second server, in some embodiments, is a management and control server for the enterprise network that identifies the most optimal cloud gateways for each edge router in the enterprise network to reach the SaaS application server, and provides identifiers for the most optimal cloud gateways to each edge router.

The second server, in some embodiments, is also responsible for directing each cloud gateway to compute latency scores (i.e., rather than the edge routers each directing the cloud gateways to compute latency scores), and periodically collects the latency scores to dynamically identify the most optimal cloud gateways for each edge router. In some embodiments, the second server causes the edge router to automatically switch from the first cloud gateway to another cloud gateway upon identifying the other gateway router as the most optimal cloud gateway based on updated latency scores for the first cloud gateway and the other cloud gateway. For instance, in some embodiments, the second cloud gateway is a default gateway assigned to the edge router for forwarding data messages to the SaaS application server until the edge router receives the identifier for the first cloud gateway when the second server determines that the first cloud gateway is the most optimal gateway for use by the edge router to reach the SaaS application server. The second server of some embodiments also provides the location information and latency scores associated with the first cloud gateway to the edge router when providing the identifier for the first cloud gateway.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
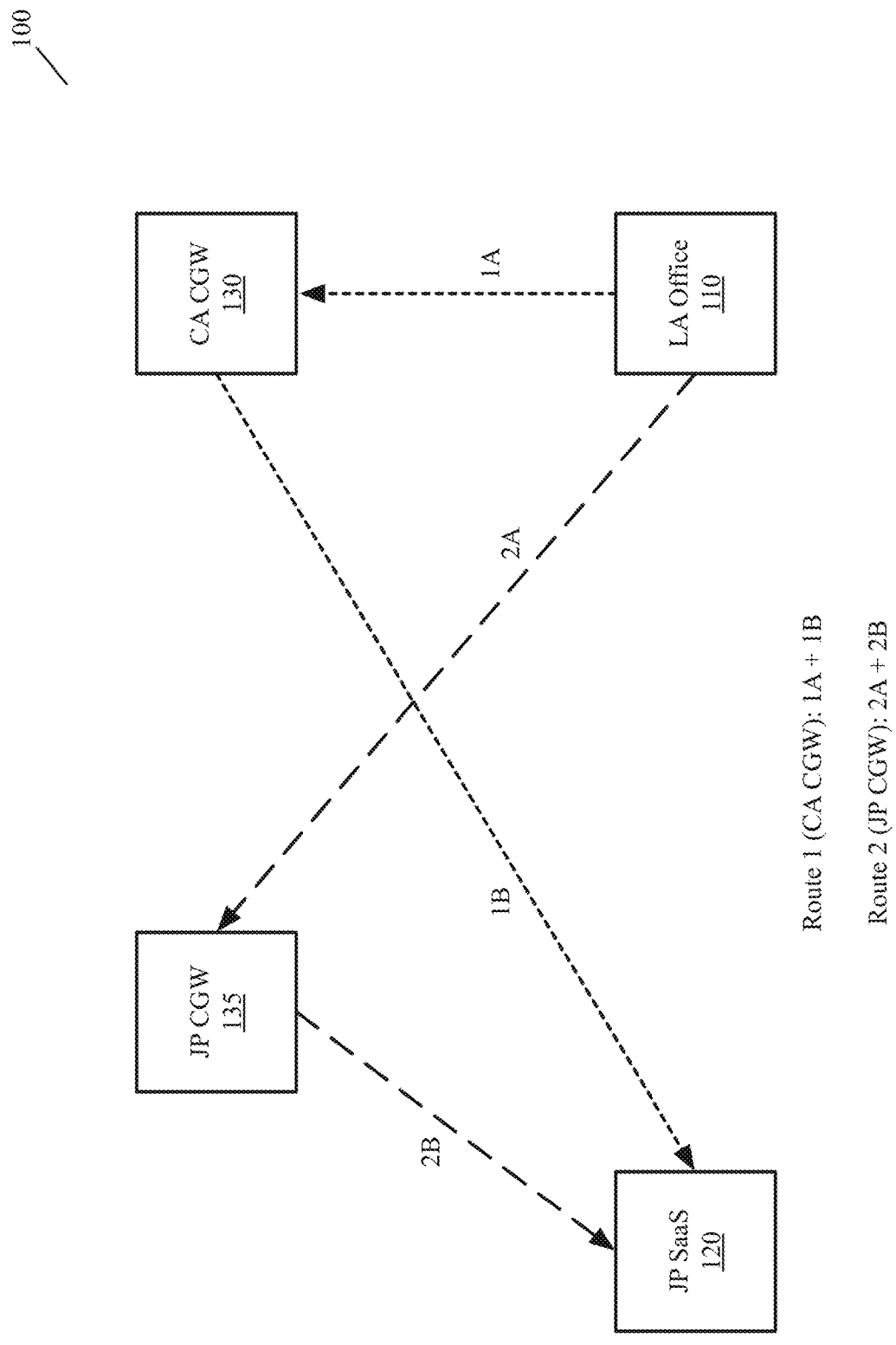
FIG. 1 conceptually illustrates a block diagram of different routes between a branch office of an enterprise network for an entity and a geographically distant datacenter hosting a SaaS application server, in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of routing data message traffic between an edge router at a branch first location for an enterprise network and a SaaS (software as a service) application server provided by a third-party at a second location. The method is performed, in some embodiments, by the edge router at the branch first location. The method queries a (global server load balancing) GSLB-aware DNS (domain name system) server for a cloud gateway from multiple cloud gateways at multiple locations through which a particular destination network address for the SaaS application server can be reached. From the GSLB-aware DNS server, the method receives an identifier for a first cloud gateway that is farther from the first location than a second cloud gateway, but closer to the second location than the second cloud gateway. The method then uses an optimized SD-WAN connection to the first cloud gateway to forward data messages for the first cloud gateway to the SaaS application at the second location.

In some embodiments, each link between the edge router and a cloud gateway is associated with a respective latency score. For instance, a first link between the edge router and the first cloud gateway is associated with a first latency score, in some embodiments, and a second link between the edge router and the second cloud gateway. In some embodiments, after receiving the identifier for the first cloud gateway, the edge router sends requests to the first and second cloud gateways for latency scores associated with the respective links between the first and second cloud gateways and the SaaS application server. In response to the requests, the edge router of some embodiments receives a third latency score from the first cloud gateway associated with a third link between the first cloud gateway and the SaaS application server, and receives a fourth latency score from the second cloud gateway associated with a fourth link between the second cloud gateway and the SaaS application server.

The first latency score associated with the first link between the edge router and the first cloud gateway and the fourth latency score associated with the fourth link between the second cloud gateway and the SaaS application server are high latency scores, in some embodiments. Conversely, in some embodiments, the second latency score associated with the second link between the edge router and the second cloud gateway and the third latency score associated with the third link between the first cloud gateway and the SaaS application server are low latency scores. In some embodiments, the SaaS application server is associated with a low latency requirement that specifies a maximum latency threshold for the last mile connectivity to the SaaS application (i.e., the unmanaged, unoptimized links from the cloud gateways to the SaaS application server). In some such embodiments, the first cloud gateway is identified as the optimal cloud gateway for reaching the SaaS application server based on a determination that the third latency score meets the low latency requirement (i.e., does not exceed the maximum latency threshold), while the fourth latency score does not meet the low latency requirement (i.e., does exceed the maximum latency threshold).

In some embodiments, the first and second cloud gateways identify the latency scores provided to the edge router by sending probe packets to the SaaS application server. The first and second cloud gateways derive latency measurements from the probe packets to generate the latency scores for the links between the first and second cloud gateways and the SaaS application server, according to some embodiments. The probe packets, in some embodiments, include layer 4 (L4) and layer 7 (L7) probe packets.

In addition to the first cloud gateway being farther from the first location than the second cloud gateway, the first cloud gateway of some embodiments is also associated with a longer (round-trip time) RTT than the second cloud gateway (i.e., due to the increased distance to the first cloud gateway). In some embodiments, the first cloud gateway is farther from the edge router than the second cloud gateway in terms of physical distance, while in other embodiments, the first cloud gateway is farther from the edge router than the second cloud gateway in terms of signal distance. In still other embodiments, the first cloud gateway is farther from the edge router than the second cloud gateway in terms of both physical distance and signal distance. The edge router of some embodiments determines that the first cloud gateway is farther than the second cloud gateway based on proximity information provided by a server (e.g., the DNS server or a management and control server), while in other embodiments, the edge router makes this determination by performing a proximity operation to determine the distance to each cloud gateway.

In some embodiments, the DNS server is a DNS first server that provides a particular destination network address for the SaaS application server to the edge router, while a second server provides the identifier for the first cloud gateway to the edge router. The second server, in some embodiments, is a management and control server for the enterprise network that identifies the most optimal cloud gateways for each edge router in the enterprise network to reach the SaaS application server, and provides identifiers for the most optimal cloud gateways to each edge router.

The second server, in some embodiments, is also responsible for directing each cloud gateway to compute latency scores (i.e., rather than the edge routers each directing the cloud gateways to compute latency scores), and periodically collects the latency scores to dynamically identify the most optimal cloud gateways for each edge router. In some embodiments, the second server causes the edge router to automatically switch from the first cloud gateway to another cloud gateway upon identifying the other gateway router as the most optimal cloud gateway based on updated latency scores for the first cloud gateway and the other cloud gateway. For instance, in some embodiments, the second cloud gateway is a default gateway assigned to the edge router for forwarding data messages to the SaaS application server until the edge router receives the identifier for the first cloud gateway when the second server determines that the first cloud gateway is the most optimal gateway for use by the edge router to reach the SaaS application server. The second server of some embodiments also provides the location information and latency scores associated with the first cloud gateway to the edge router when providing the identifier for the first cloud gateway.

FIG. 1 conceptually illustrates a block diagram of different routes between a branch office of an enterprise network for an entity and a geographically distant datacenter hosting a SaaS application server, in some embodiments. As shown, the diagram 100 includes a Los Angeles ("LA") branch office 110 and a Japan datacenter 120 at which a SaaS application server is located. The LA branch office 110 is connected through an SD-WAN (e.g., to cloud gateways 130 and 135 through which data messages to the Japan datacenter 120 can be forwarded. While only one branch office 110 is shown, the SD-WAN (also referred to herein as a virtual network) may connect multiple branch sites to each other, as well as to, e.g., a controller (not shown).

The connections between the LA branch office 110 and each of the cloud gateways 130-135 are between an edge router (e.g., VeloCloud® edge (VCE)) at the branch office and the cloud gateways (e.g., VeloCloud® gateways (VCGs)), according to some embodiments. The edge routers of some embodiments are edge machines (e.g., virtual machines (VMs), containers, programs executing on computers, etc.) and/or standalone appliances that operate at multi-computer locations of the particular entity (e.g., at an office or datacenter of the entity) to connect the computers at their respective locations to other nodes (e.g., gateways, hubs, etc.) in the virtual network. In some embodiments, the nodes are clusters of nodes at each of the branch sites. In other embodiments, the edge nodes are deployed to each of the branch sites as high-availability pairs such that one edge node in the pair is the active node and the other edge node in the pair is the standby node that can take over as the active edge node in case of failover.

An example of an entity for which such a virtual network can be established includes a business entity (e.g., a corporation), a non-profit entity (e.g., a hospital, a research organization, etc.), and an education entity (e.g., a university, a college, etc.), or any other type of entity. Examples of public cloud providers include Amazon Web Services® (AWS), Google Cloud Platform™ (GCP), Microsoft Azure®, etc., while examples of entities include a company (e.g., corporation, partnership, etc.), an organization (e.g., a school, a non-profit, a government entity, etc.), etc. In other embodiments, hub forwarding elements can also be deployed in private cloud datacenters of a virtual WAN provider that hosts these hubs to establish SD-WANs for different entities.

In this example, one cloud gateway 130 is located in California and the other cloud gateway 135 is located in Japan. The LA branch office 110 has two route options using the two cloud gateways for reaching the Japan datacenter 120. The first route includes connection 1A from the LA branch office 110 to the California cloud gateway 130 and connection 1B from the California cloud gateway 130 to the Japan datacenter 120. The second route includes connection 2A from the LA branch office 110 to the Japan cloud gateway 135 and connection 2B from the Japan cloud gateway 135 to the Japan datacenter 120. The respective connections 1A and 2A from the LA branch office 110 to the California and Japan cloud gateways 130 and 135 are managed by the SD-WAN and therefore can be optimized. In other words, when both forwarding elements (i.e., a forwarding element at the LA branch office 110 and either of the California and Japan cloud gateways 130 and 135) for one hop (i.e., source and destination forwarding elements) are managed by the SD-WAN, controllers for the SD-WAN can configure the two managed forwarding elements to perform their forwarding operations in a way that maximizes QoS (quality of service), or other metrics such as throughput, according to some embodiments.

In some embodiments, for instance, multiple links of any type (e.g., DSL (digital subscriber line), cable modem, Ethernet, fiber, LTE/3G/4G/5G, MPLS (multiprotocol label switching), radio, satellite, Wi-Fi, etc.), location, or provider can be leveraged to optimize connections between branch offices and cloud gateways. Also, in some embodiments, managed links can be configured to provide a desirable attribute associated with certain metrics such as throughput, QoS, and packet drops. Additional methods of link optimization, in some embodiments, can include utilizing link scores (e.g., assigned based on QoS metrics collected from devices connected by the SD-WAN), alternate path selections, packet replication, forward error correction, etc. For example, some embodiments utilize dynamic multipath optimization (DMPO) to optimize links in the SD-WAN. DMPO, according to some embodiments, is a cloud-delivered architecture for on-premises and cloud applications that enables the use of multiple WAN transports simultaneously, thereby maximizing bandwidth and ensuring application performance.

Returning to the diagram 100, while the distance from the LA branch office 110 to the Japan cloud gateway 135 is longer than the distance from the LA branch office 110 to the California cloud gateway 130, the last mile connectivity from the Japan cloud gateway 135 to the Japan datacenter 120 is shorter than the last mile connectivity from the California cloud gateway 130 to the Japan datacenter 120. Unlike the connections 1A and 2A between the LA branch office 110 and the California and Japan cloud gateway 130 and 135, the last mile connectivity links 1B and 2B are not managed by the SD-WAN and do not benefit from the same optimizations as the links that are managed by the SD-WAN. As a result, the second route through the Japan cloud gateway 135 is the optimal route due to the distance covered by the unmanaged portion of the path, according to some embodiments. That is, while the first route through the California cloud gateway 130 may be associated with better overall metrics (e.g., shorter round-trip time), the combination of the potential for optimizing the link covering the greater distance (i.e., link 2A) and the shorter length of link 2B compared to link 1B that are associated with using the Japan cloud gateway 135 make the second route through the Japan cloud gateway 135 the optimal route (i.e., compared to the route through California cloud gateway 130).

Figure 2:
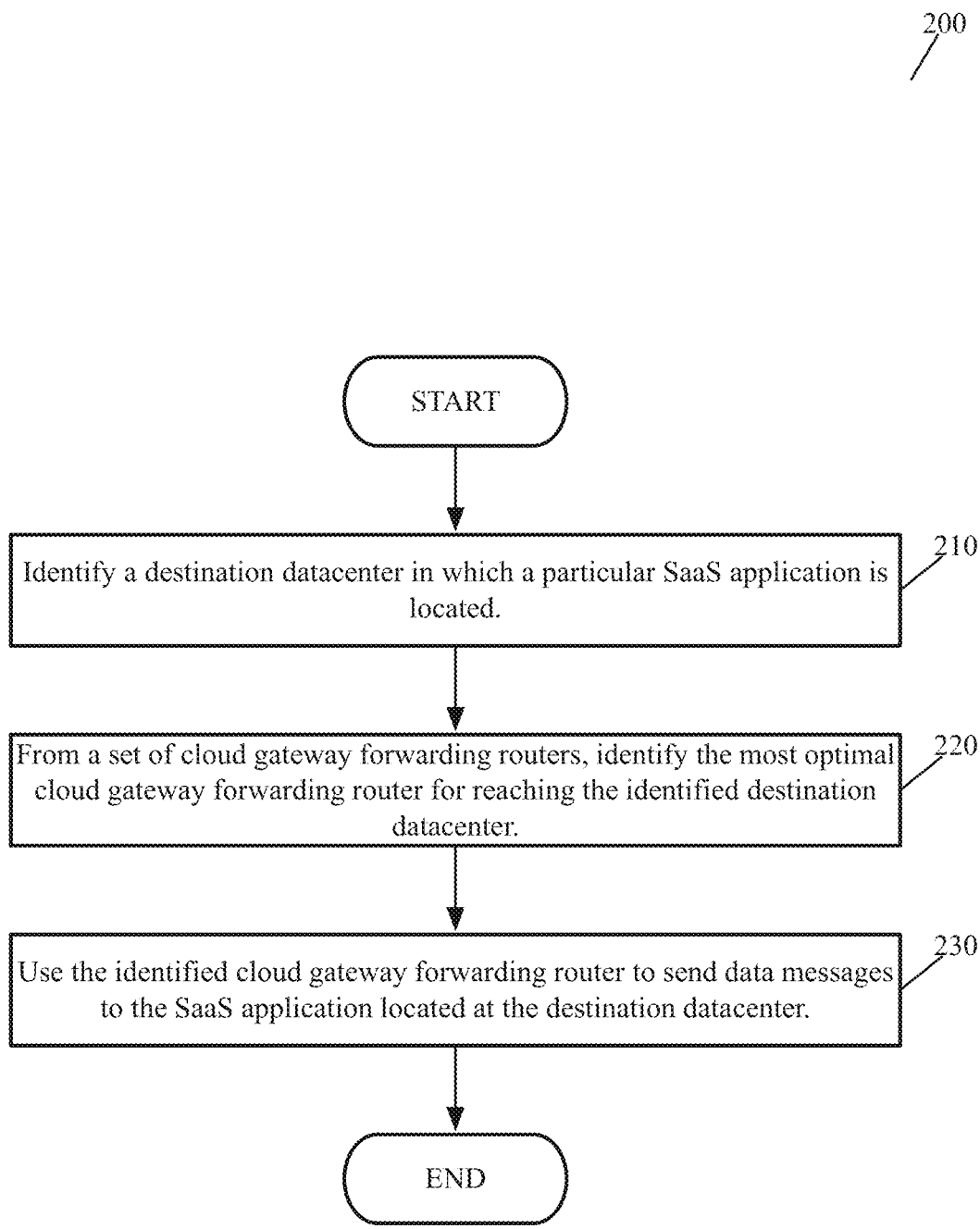
FIG. 2 conceptually illustrates a process of some embodiments for identifying a cloud gateway for forwarding data messages to a datacenter hosting a SaaS application server.

FIG. 2 conceptually illustrates a process 200 of some embodiments for identifying a cloud gateway for forwarding data messages to a datacenter hosting a SaaS application server. The process 200 is performed in some embodiments by an edge router at a branch office of an enterprise network (e.g., an edge router at the LA branch office 110 in the diagram 100). The process 200 starts when the edge router identifies (at 210) a destination datacenter in which a particular SaaS application is located. In some embodiments, the edge router identifies the destination datacenter by requesting a network address (e.g. IP address) associated with the SaaS application from a DNS server, and receiving a network address and location information in response to the request.

From a set of cloud gateways through which the destination datacenter hosting the SaaS application can be reached, the process 200 identifies (at 220) the most optimal cloud gateway for forwarding data messages to the destination datacenter. In some embodiments, the edge router identifies the most optimal cloud gateway based on receiving an identifier for a particular cloud gateway from the DNS server from which the network address and location of the destination datacenter were received. In other embodiments, the edge router identifies the most optimal cloud gateway based on receiving an identifier for a particular cloud gateway from a management and control server. In still other embodiments, the edge router compares location and latency information associated with the set of cloud gateways to identify the most optimal cloud gateway for itself. For instance, the edge router of some embodiments determines whether a default (e.g., primary) cloud gateway assigned to the edge router and the gateway nearest to the DNS server match, and when these cloud gateways do not match, the edge router identifies the cloud gateway with the lowest latency to the SaaS application server.

In some embodiments, the edge router obtains latency data from the cloud gateways by directing the cloud gateways to perform probes to the SaaS application server and to compute latency scores based on those probes for providing to the edge router. The edge router of some embodiments also already has latency scores for connections from the edge router to the cloud gateways based on DMPO. As mentioned above, DMPO, according to some embodiments, is a cloud-delivered architecture for on-premises and cloud applications that enables the use of multiple WAN transports simultaneously, thereby maximizing bandwidth and ensuring application performance.

Returning to the process 200, the process 200 then uses (at 230) the identified cloud gateway to forward data messages to the SaaS application located at the destination datacenter. In the diagram 100, for instance, an edge router at the LA branch office 110 would use an optimized SD-WAN connection to either the California cloud gateway 130 or the Japan cloud gateway 135 based on which cloud gateway has been identified as the most optimal cloud gateway to reach the SaaS application server at the Japan datacenter 120. Following 230, the process 200 ends.

Figure 3:
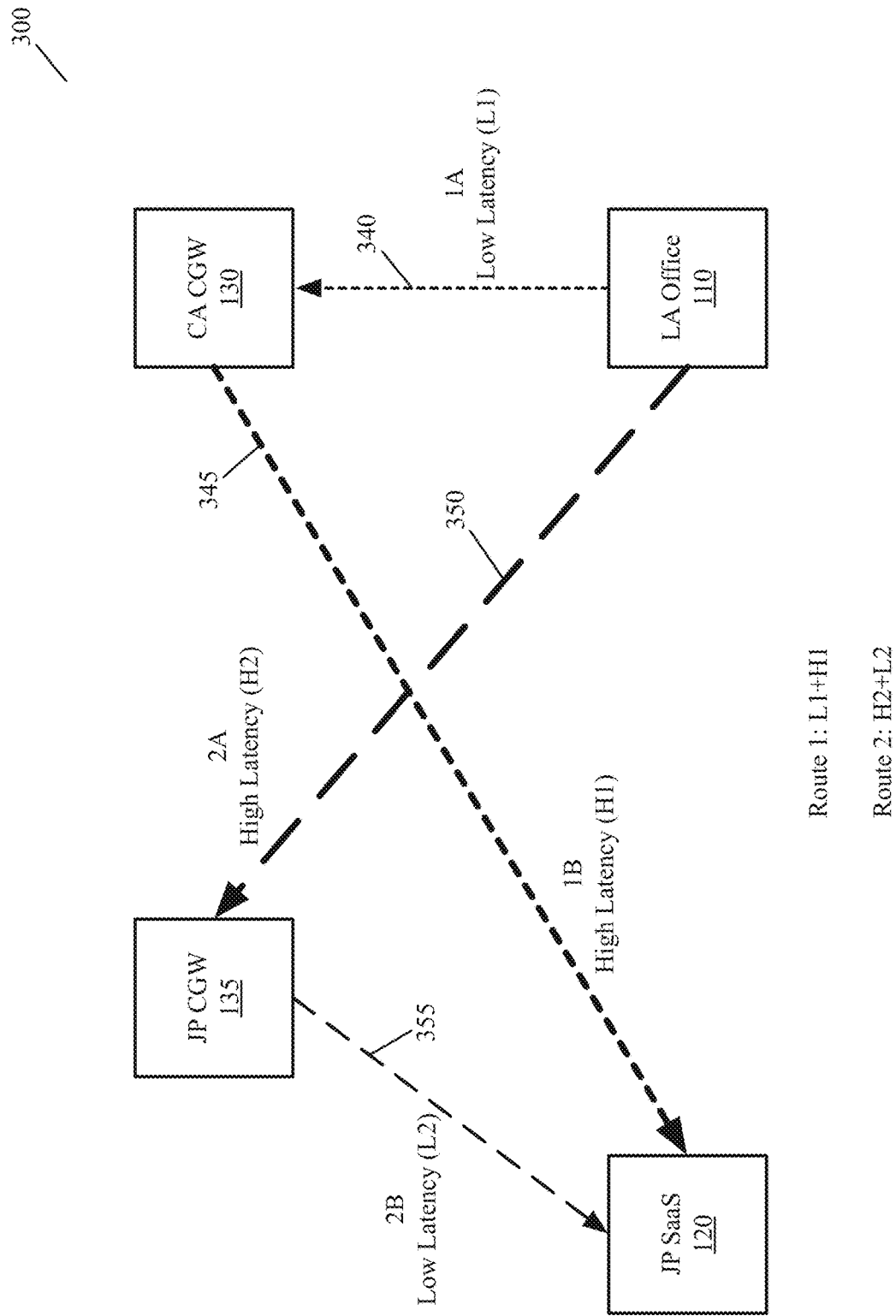
FIG. 3, for instance, conceptually illustrates the block diagram of FIG. 1 with latency scores of some embodiments associated with the connections between the LA branch office, cloud gateways, and Japan datacenter.

In some embodiments, the cloud gateway used by the edge router to forward data messages to a SaaS server is selected based on latency scores associated with the links between the edge router, cloud gateways, and destination datacenter. FIG. 3, for instance, conceptually illustrates the block diagram 100 of FIG. 1 with latency scores of some embodiments associated with the connections between the LA branch office 110, cloud gateways 130-135, and Japan datacenter 120.

As shown, the link 340 between the LA branch office 110 and the California cloud gateway 130 and the link 355 between the Japan cloud gateway 135 are indicated as being low latency links. Conversely, the link 345 between the California cloud gateway 130 and the Japan datacenter 120 and the link 350 between the LA branch office 110 and the Japan cloud gateway 135 are indicated as being high latency links. Thus, the first route from the LA office 110 to the Japan datacenter 120 through the California cloud gateway 130 includes a low latency first connection to the cloud gateway and a high latency second connection for the last mile connectivity from the cloud gateway 130 to the datacenter 120, while the second route from the LA office 110 to the Japan datacenter 120 through the Japan cloud gateway 135 includes a high latency first connection to the cloud gateway 135 and a low latency second connection for the last mile connectivity from the cloud gateway 135 to the Japan datacenter 120.

In some embodiments, the SaaS application at the Japan datacenter 120 has low latency requirements, and the Japan cloud gateway 135 is the more optimal cloud gateway compared to the California cloud gateway 130 based on the connection between the Japan cloud gateway 135 and the Japan datacenter 120 having low latency, while the connection between the California cloud gateway 130 and Japan datacenter 120 has high latency. In some embodiments, the connection between the Japan cloud gateway 135 and the Japan datacenter 120 has lower latency than the connection between the California cloud gateway 130 and the Japan datacenter 120 based on the shorter distance between the Japan cloud gateway 135 and Japan datacenter 120.

Figure 4:
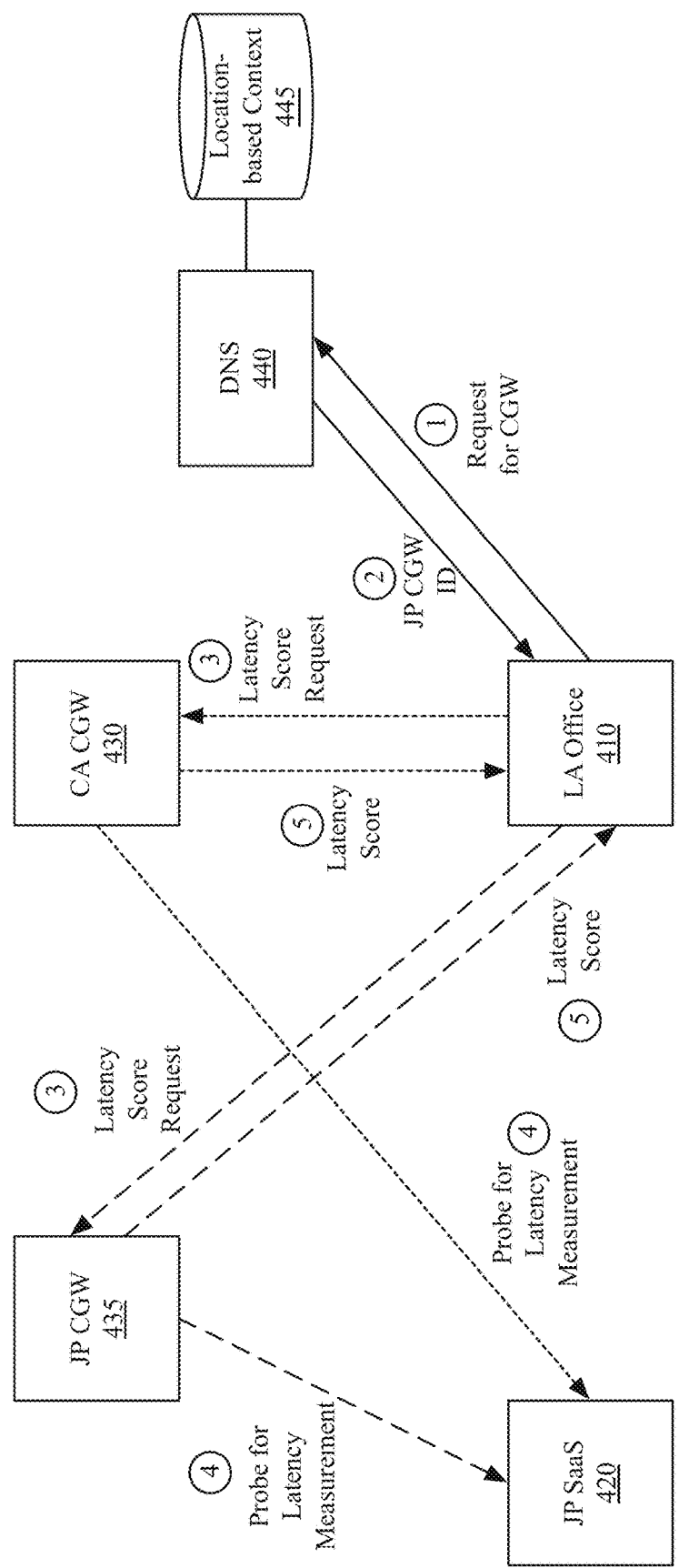
FIG. 4 conceptually illustrates a block diagram of a workflow of some embodiments for a branch office to identify a cloud gateway from a set of cloud gateways based on latency scores associated with using each cloud gateway in the set.

FIG. 4 conceptually illustrates a block diagram of a workflow of some embodiments for a branch office to identify a cloud gateway from a set of cloud gateways based on latency scores associated with using each cloud gateway in the set. As illustrated, the diagram 400 includes an LA branch office 410, a Japan datacenter 420 that hosts a SaaS application server, a cloud gateway 430 located in California, a cloud gateway 435 located in Japan, a DNS server 440, and location-based context 445.

Figure 5:
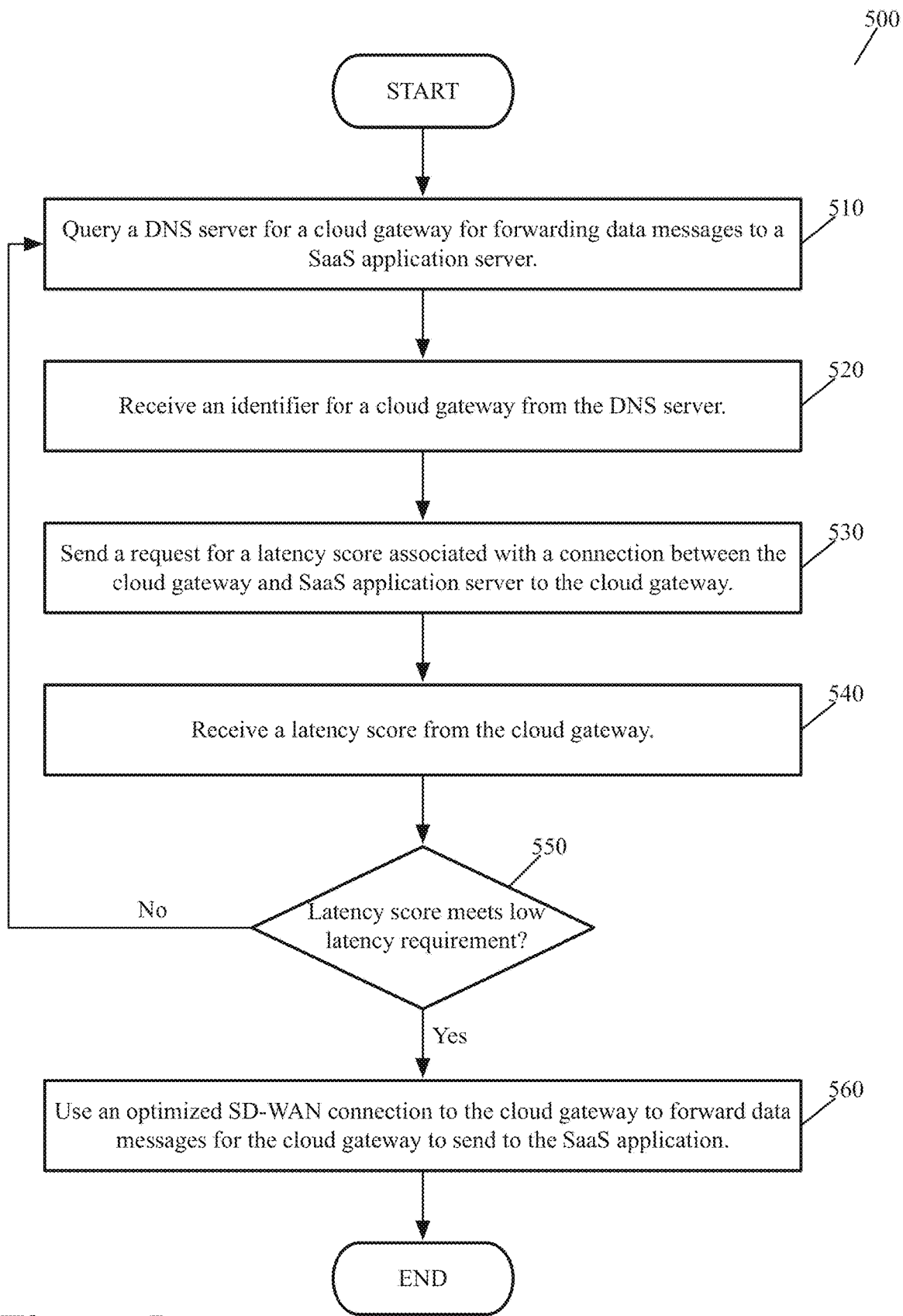
FIG. 5 conceptually illustrates a process for identifying a cloud gateway for forwarding data messages to a SaaS application server, in some embodiments.

The diagram 400 will be further described below by reference to FIG. 5, which conceptually illustrates a process 500 for identifying a cloud gateway for forwarding data messages to a SaaS application server, in some embodiments. The process 500 is performed in some embodiments by an edge router for a branch office of an enterprise network. The process 500 starts when the edge router queries (at 510) a DNS server for a cloud gateway for forwarding data messages to a SaaS application server. Like the diagram 400, the SaaS application server of some embodiments is located in a datacenter that is geographically distant from the branch office trying to reach the SaaS application server. The edge router at the branch office 410 sends a request for a cloud gateway (at the encircled 1) to the DNS server 440.

In some embodiments, prior to requesting the cloud gateway, the edge router first requests a network address and location information for the SaaS application server. The DNS server 440 of some embodiments obtains location information for the SaaS application server at the resolved network address from the location-based context 445, and provides both the network address and location information to the edge router at the branch office 410 in response to the request.

The process 500 receives (at 520) an identifier for a cloud gateway from the DNS server. For instance, the branch office 410 receives (at the encircled 2) an identifier for the Japan cloud gateway 435. In some embodiments, prior to requesting and receiving the cloud identifier, the edge router is assigned a default cloud gateway for use in forwarding data messages to third-party SaaS application servers, and thus already has an identifier for at least one other cloud gateway. In other embodiments, the DNS server responds to the edge router's request by providing two or more identifiers to the edge router for the edge router to select from.

The process 500 sends (at 530) a request for a latency score associated with a connection between the cloud gateway and SaaS application server to the cloud gateway. The SaaS application server of some embodiments is associated with a low latency requirement, and thus the edge router of some such embodiments sends a request to the cloud gateway for a latency score to determine whether the latency score meets the low latency requirement. In the diagram 400, for instance, the LA branch office 410 (i.e., an edge router at the branch office) sends requests for latency scores (at the encircled 3) to the California and Japan cloud gateways 430-435.

In some embodiments, the cloud gateways compute latency scores by sending probe packets to the SaaS application server and collecting latency measurements using the probe packets. For example, the California and Japan cloud gateways 430-435 are each shown (at the encircled 4) performing probes for latency measurements between the cloud gateways 430-435 and the Japan datacenter 420 that hosts the SaaS application server. The probe packets, in some embodiments, include L4 and L7 probe packets.

The process 500 then receives (at 540) a latency score from the cloud gateway, such as the latency scores received (at the encircled 5) at the LA branch office 410 in the diagram 400, and determines (at 550) whether the latency score meets the low latency requirement associated with the SaaS application server. In some embodiments, the distance between a cloud gateway and the destination SaaS application server affects latency such that a cloud gateway that is farther from the SaaS application server has a higher latency than a cloud gateway that is closer to the SaaS application server. When the latency score from the cloud gateway does not meet the low latency requirement (e.g., is higher than a specified latency threshold), the process 500 returns to 510 to query the DNS server for a cloud gateway. In some embodiments, the edge router uses or continues to use a default cloud gateway to forward data messages to the SaaS application server while awaiting the next cloud gateway from the DNS server.

When the latency score does meet the low latency requirement (e.g., is lower than a specified latency threshold), the process 500 transitions to use (at 560) an optimized SD-WAN connection to the cloud gateway to forward data messages for the cloud gateway to send to the SaaS application server. Following 560, the process 500 ends.

Figure 6:
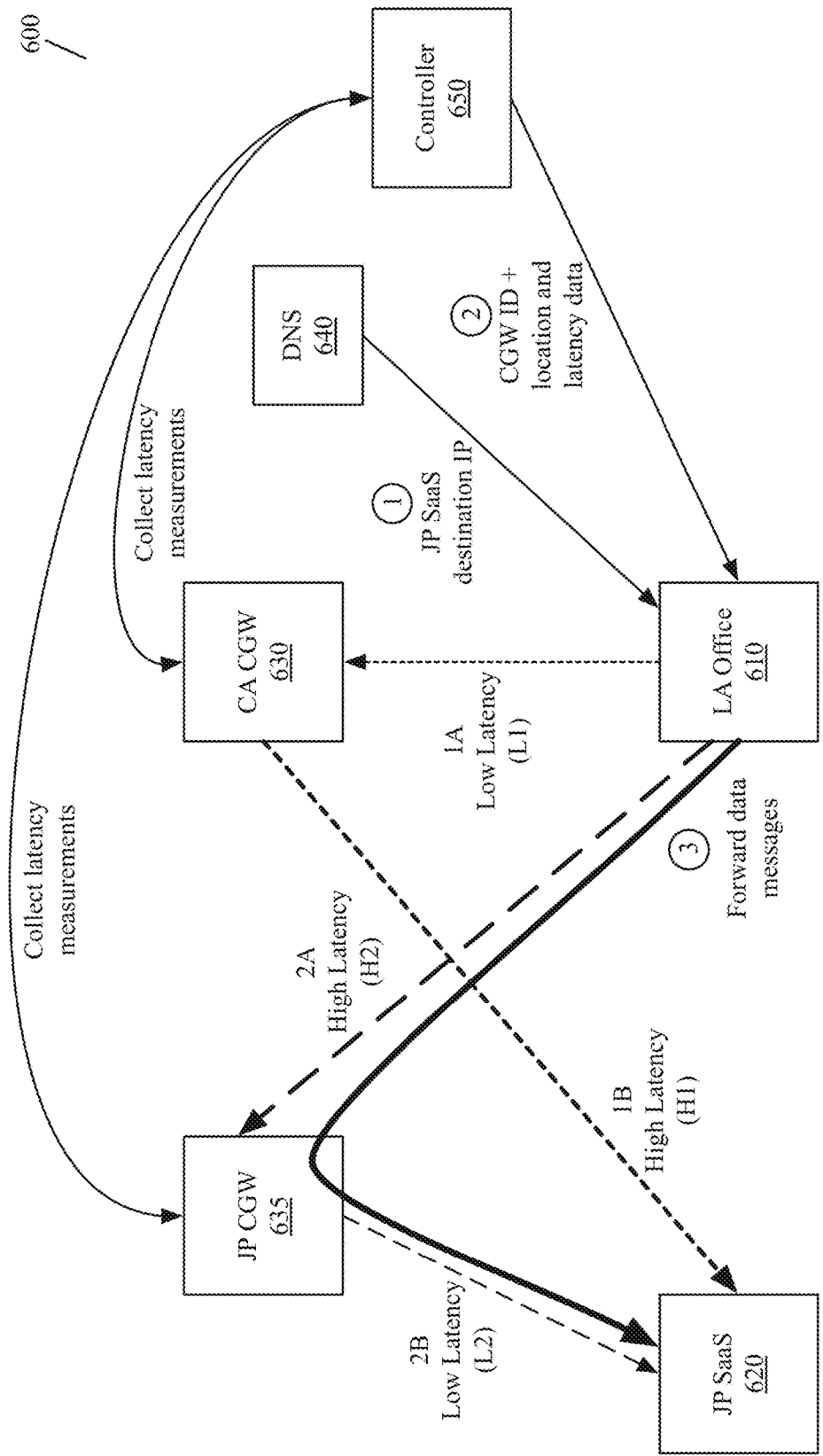
FIG. 6 conceptually illustrates a block diagram of some embodiments in which a branch office obtains cloud gateway information from a controller for use in forwarding data messages to a SaaS application server.

In some embodiments, rather than obtaining a cloud gateway (i.e., identifier for a cloud gateway) from the DNS server, the edge router instead requests the cloud gateway from a controller for the enterprise network (e.g., a Velo-Cloud® Orchestrator (VCO)). FIG. 6 conceptually illustrates a block diagram 600 of some embodiments in which a branch office obtains cloud gateway information from a controller for use in forwarding data messages to a SaaS application server.

The controller 650, in some embodiments, manages business policies for the SD-WAN. The controller 650 is hosted by a cloud, in some embodiments, and on-premises in other embodiments. In some embodiments, new business policies may be created (e.g., network preferred DNS) that may trigger different actions, such as configuring or choosing a business policy for a tenant to be implemented by edge routers at the edges of the tenant networks. For example, an edge router of some embodiments may receive a policy specified for a SaaS application, and the edge router then configures a rule to match the business policy. The edge router of some such embodiments may send data messages to each cloud gateway assigned to the edge router to instruct the cloud gateways to perform L4 and/or L7 probes to the SaaS application to collect latency measurements. In other embodiments, the controller 650 directs the cloud gateways to perform these probes and provides the results to the edge router. As mentioned above, the edge router of some embodiments already has latency data from the edge router to each cloud gateway based on DMPO, and also either stores, or obtains, proximity location information for each cloud gateway.

As shown, rather than an edge router at the branch office 610 requesting latency scores from the cloud gateways 630-635, the controller 650 collects latency measurements from the California and Japan cloud gateways 630-635. In some embodiments, the controller 650 collects latency measurements periodically to ensure that each edge router is using the most optimal cloud gateway for forwarding data messages to destinations outside of the enterprise network, such as the third-party SaaS application server at the Japan datacenter 620. For instance, if a particular cloud gateway's updated latency score increases, the controller 650 of some embodiments may cause an edge router assigned to that cloud gateway to automatically switch to a different cloud gateway that is associated with a lower latency score.

In some embodiments, the controller 650 may assign a default cloud gateway to an edge router for reaching third-party sites within a first region, and assign a secondary cloud gateway to the edge router for reaching third-party sites within a second region. For example, the controller 650 of some embodiments may assign the California cloud gateway 630 as a default cloud gateway to an edge router at the LA branch office 610 for use in reaching third-party sites in California and surrounding states, and subsequently assign the Japan cloud gateway 635 as a secondary cloud gateway for use in reaching at least the Japan datacenter 620. The edge router of some such embodiments may automatically switch between the different cloud gateways based on the destination network addresses of data messages being forwarded.

Figure 7:
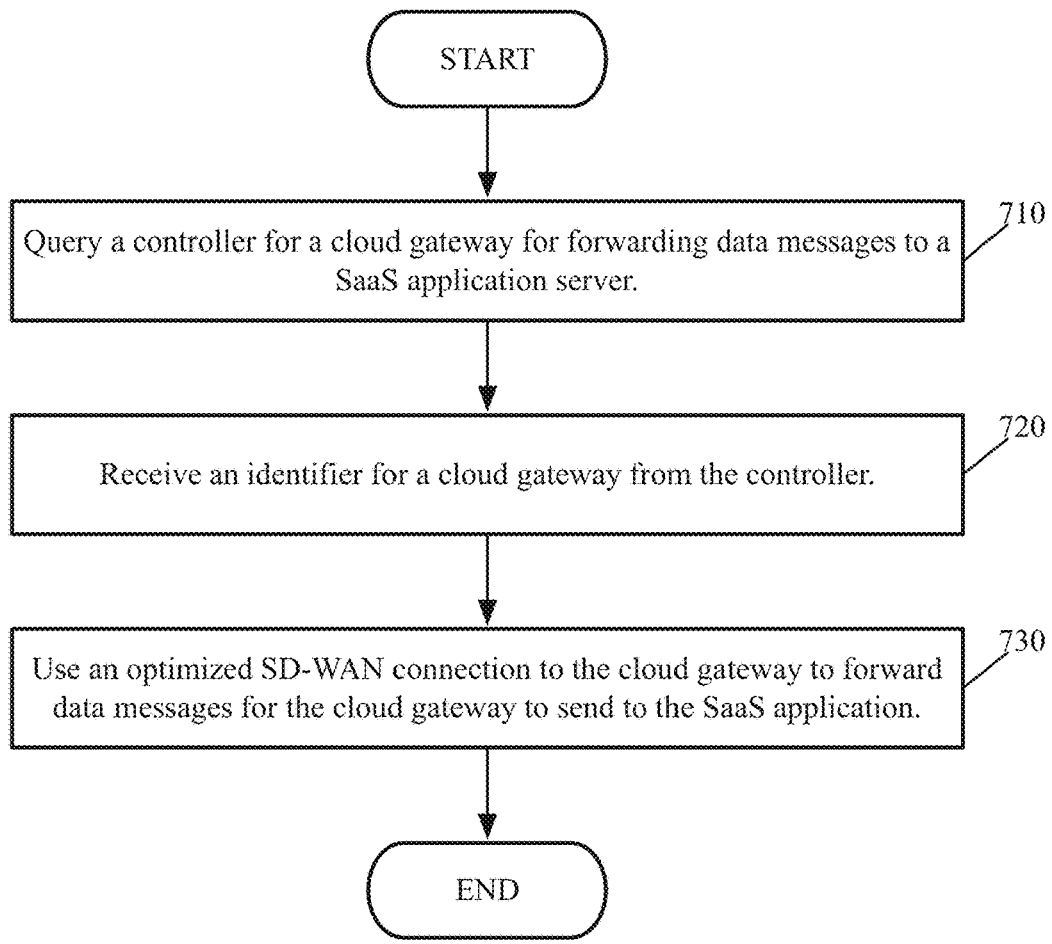
FIG. 7 conceptually illustrates a process of some embodiments for obtaining a cloud gateway from a controller for use in forwarding data messages to a SaaS application server.

FIG. 6 will be further described below by reference to FIG. 7, which conceptually illustrates a process 700 of some embodiments for obtaining a cloud gateway from a controller for use in forwarding data messages to a SaaS application server. The process 700 is performed in some embodiments by an edge router at a branch office (e.g., LA branch office 610). The process 700 starts when the edge router queries (at 710) a controller for a cloud gateway for forwarding data messages to a SaaS application server.

In some embodiments, for example, after the edge router receives a destination network address and location information for a SaaS application, the edge router may use the received destination network address to query the controller for a cloud gateway to use to reach the SaaS application. In the diagram 600, the LA branch office 610, for example, receives a destination IP for the Japan SaaS application from the DNS server 640 (at the encircled 1), and then receives a cloud gateway identifier and location and latency data for the cloud gateway from the controller 650 (at the encircled 2).

The process 700 receives (at 720) an identifier for a cloud gateway from the controller. In some embodiments, the edge router is assigned a set of cloud gateways by the controller for use in forwarding data messages to entities outside of the enterprise network, and queries the controller for an identifier corresponding to a cloud gateway from the set that is most optimal for reaching the destination IP associated with the SaaS application. As also described above, the controller of some embodiments determines the most optimal cloud gateway for use by an edge router based on latency scores associated with connections between the cloud gateways and the destination.

For example, in the diagram 600, both available routes from the LA branch office 610 to the Japan datacenter 620 include a high latency connection and a low latency connection. However, the low latency connection for the route that uses the Japan cloud gateway 635 is the unmanaged last mile connection (i.e., unoptimized connection) to the Japan datacenter 620, whereas the low latency connection for the route that uses the California cloud gateway 630 is the managed connection (i.e., optimized connection) from the LA branch office 610 to the California cloud gateway 630. While the route through the California cloud gateway 630 may be identified as the best route (e.g., in a routing table of the edge router based on proximity to the LA branch office 610), the Japan cloud gateway 635 may be identified by the controller 650 as the most optimal cloud gateway based on the low latency associated with the unmanaged, unoptimized connection between the Japan cloud gateway 635 and Japan datacenter 620.

The process 700 uses (at 730) an optimized SD-WAN connection to the cloud gateway to forward data messages for the cloud gateway to send to the SaaS application server. The LA branch office 610, for instance, is illustrated (at the encircled 3) as forwarding data messages to the Japan datacenter 620 via the Japan cloud gateway 635. Following 730, the process 700 ends.

Figure 8:
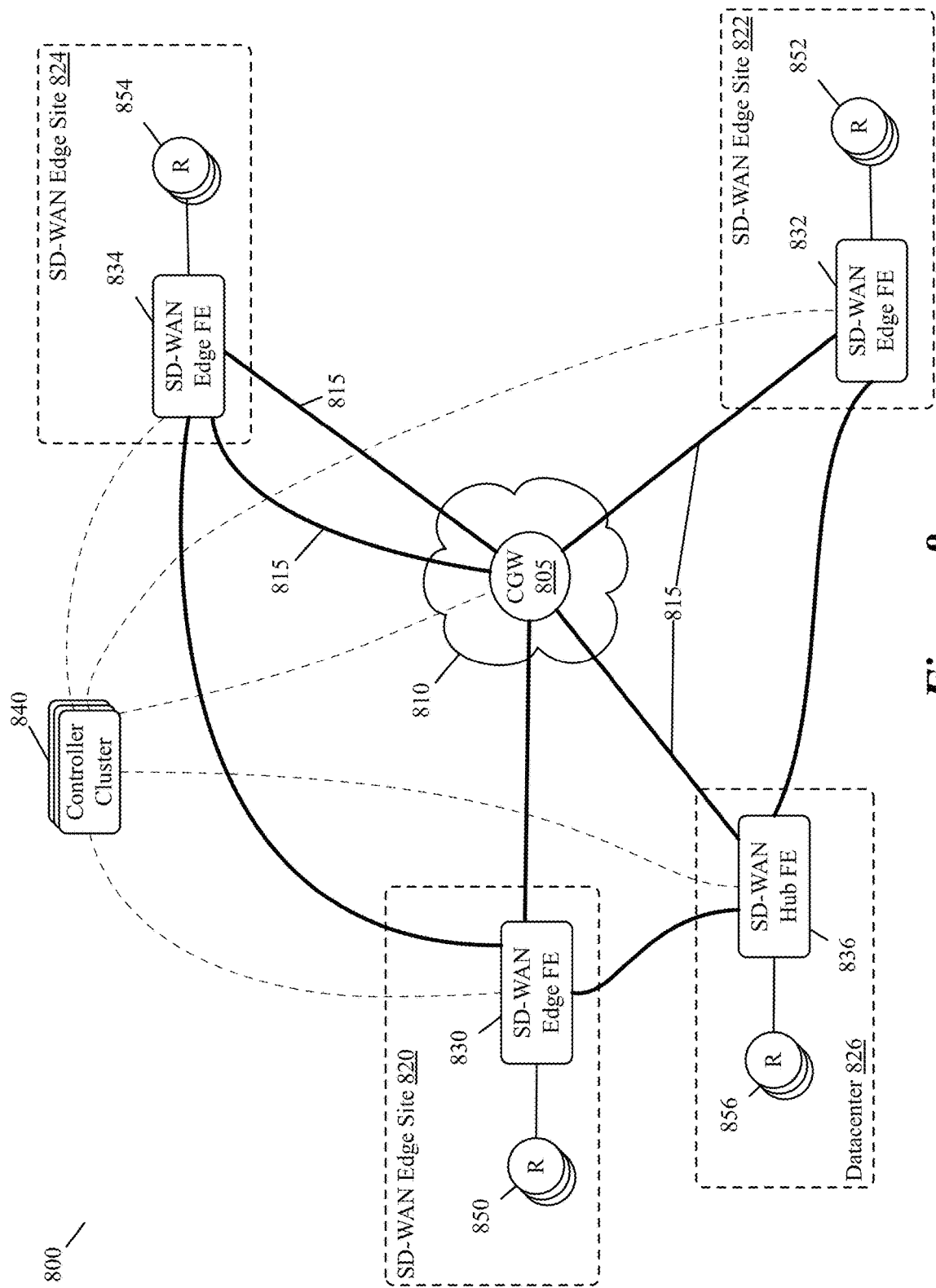
FIG. 8 illustrates an example of a standard SD-WAN environment in which some embodiments of the invention are implemented.

FIG. 8 illustrates an example of a standard SD-WAN environment 800 in which some embodiments of the invention are implemented. The SD-WAN 800 is created in some embodiments for a particular entity using SD-WAN forwarding elements (FEs) deployed at branch sites, datacenters, and public clouds. Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc.

In the SD-WAN 800, the SD-WAN FEs include cloud gateway 805 (e.g., cloud gateway router) and SD-WAN FEs 830, 832, 834, 836. The cloud gateway (CGW) in some embodiments is an FE that is in a private or public datacenter 810. The CGW 805 in some embodiments has secure connection links (e.g., tunnels) with edge FEs (e.g., SD-WAN edge FEs 830, 832, 834, and 836) at the particular entity's multi-machine sites (e.g., SD-WAN edge sites 820, 822, and 824), such as multi-user compute sites (e.g., branch offices or other physical locations having multi user computers and other user-operated devices and serving as source computers and devices for requests to other machines at other sites), datacenters (e.g., locations housing servers), etc. These multi-machine sites are often at different physical locations (e.g., different buildings, different cities, different states, etc.).

Four multi-machine sites 820-826 are illustrated in the SD-WAN 800, with three of them being branch sites 820-824, and one being a datacenter 826. Each branch site is shown to include a respective edge FE 830, 832, and 834 (e.g., edge routers) and respective resources 850, 852, and 854. The resources 850-854, in some embodiments, are machines located at the branch sites 820-824. The datacenter site 826 is shown to include a hub FE 836 (e.g., a hub router), and datacenter resources 856. The datacenter SD-WAN FE 836 is referred to as a hub FE because in some embodiments this FE can be used to connect to other edge FEs of the branch sites 820-824. The hub FE in some embodiments uses or has one or more service engines to perform services (e.g., middlebox services) on packets that it forwards from one branch site to another branch site. The hub FE also provides access to the datacenter resources 856.

Each edge FE (e.g., SD-WAN edge FEs 830-834) exchanges packets with one or more cloud gateways 805 through one or more connection links 815 (e.g., multiple connection links available at the edge FE). In some embodiments, these connection links include secure and unsecure connection links, while in other embodiments they only include secure connection links. As shown by edge FE 834 and gateway 805, multiple secure connection links (e.g., multiple secure tunnels that are established over multiple physical links) can be established between one edge FE and a gateway.

When multiple such links are defined between an edge FE and a gateway, each secure connection link in some embodiments is associated with a different physical network link between the edge FE and an external network. For instance, to access external networks, an edge FE in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network), etc.

In some embodiments, the different physical links between the edge FE 834 and the cloud gateway 805 are the same type of links (e.g., are different MPLS links).

In some embodiments, one edge FE 830-834 can also have multiple direct links 815 (e.g., secure connection links established through multiple physical links) to another edge FE 830-834, and/or to a datacenter hub FE 836. Again, the different links in some embodiments can use different types of physical links or the same type of physical links. Also, in some embodiments, a first edge FE of a first branch site can connect to a second edge FE of a second branch site (1) directly through one or more links 815, (2) through a cloud gateway or datacenter hub to which the first edge FE connects through two or more links 815, or (3) through another edge FE of another branch site that can augment its role to that of a hub FE. Hence, in some embodiments, a first edge FE (e.g., 834) of a first branch site (e.g., 824) can use multiple SD-WAN links 815 to reach a second edge FE (e.g., 830) of a second branch site (e.g., 820), or a hub FE 836 of a datacenter site 826.

The cloud gateway 805 in some embodiments is used to connect two SD-WAN FEs 830-836 through at least two secure connection links 815 between the gateway 805 and the two FEs at the two SD-WAN sites (e.g., branch sites 820-824 or datacenter site 826). In some embodiments, the cloud gateway 805 also provides network data from one multi-machine site to another multi-machine site (e.g., provides the accessible subnets of one site to another site). Like the cloud gateway 805, the hub FE 836 of the datacenter 826 in some embodiments can be used to connect two SD-WAN FEs 830-834 of two branch sites through at least two secure connection links 815 between the hub 836 and the two FEs at the two branch sites 820-824.

In some embodiments, each secure connection link between two SD-WAN FEs (i.e., CGW 805 and edge FEs 830-836) is formed as a VPN tunnel between the two FEs. In this example, the collection of the SD-WAN FEs (e.g., FEs 830-836 and gateways 805) and the secure connections 815 between the FEs forms the SD-WAN 800 for the particular entity that spans at least the public or private cloud datacenter 810 to connect the branch and datacenter sites 820-826.

In some embodiments, secure connection links are defined between gateways in different public cloud datacenters to allow paths through the virtual network to traverse from one public cloud datacenter to another, while no such links are defined in other embodiments. Also, in some embodiments, the gateway 805 is a multi-tenant gateway that is used to define other virtual networks for other entities (e.g., other companies, organizations, etc.). Some such embodiments use tenant identifiers to create tunnels between a gateway and edge FE of a particular entity, and then use tunnel identifiers of the created tunnels to allow the gateway to differentiate packet flows that it receives from edge FEs of one entity from packet flows that it receives along other tunnels of other entities. In other embodiments, gateways are single-tenant and are specifically deployed to be used by just one entity.

The SD-WAN 800 includes a cluster of controllers 840 that serve as a central point for managing (e.g., defining and modifying) configuration data that is provided to the edge FEs and/or gateways to configure some or all of the operations. In some embodiments, this controller cluster 840 is in one or more public cloud datacenters, while in other embodiments it is in one or more private datacenters. In some embodiments, the controller cluster 840 has a set of manager servers that define and modify the configuration data, and a set of controller servers that distribute the configuration data to the edge FEs, hubs and/or gateways. In some embodiments, the controller cluster 840 directs edge FEs and hubs to use certain gateways (i.e., assigns a gateway to the edge FEs and hubs). In some embodiments, some or all of the controller cluster's functionality is performed by a cloud gateway (e.g., cloud gateway 805). The controller cluster 840 also provides next hop forwarding rules and load balancing criteria in some embodiments.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
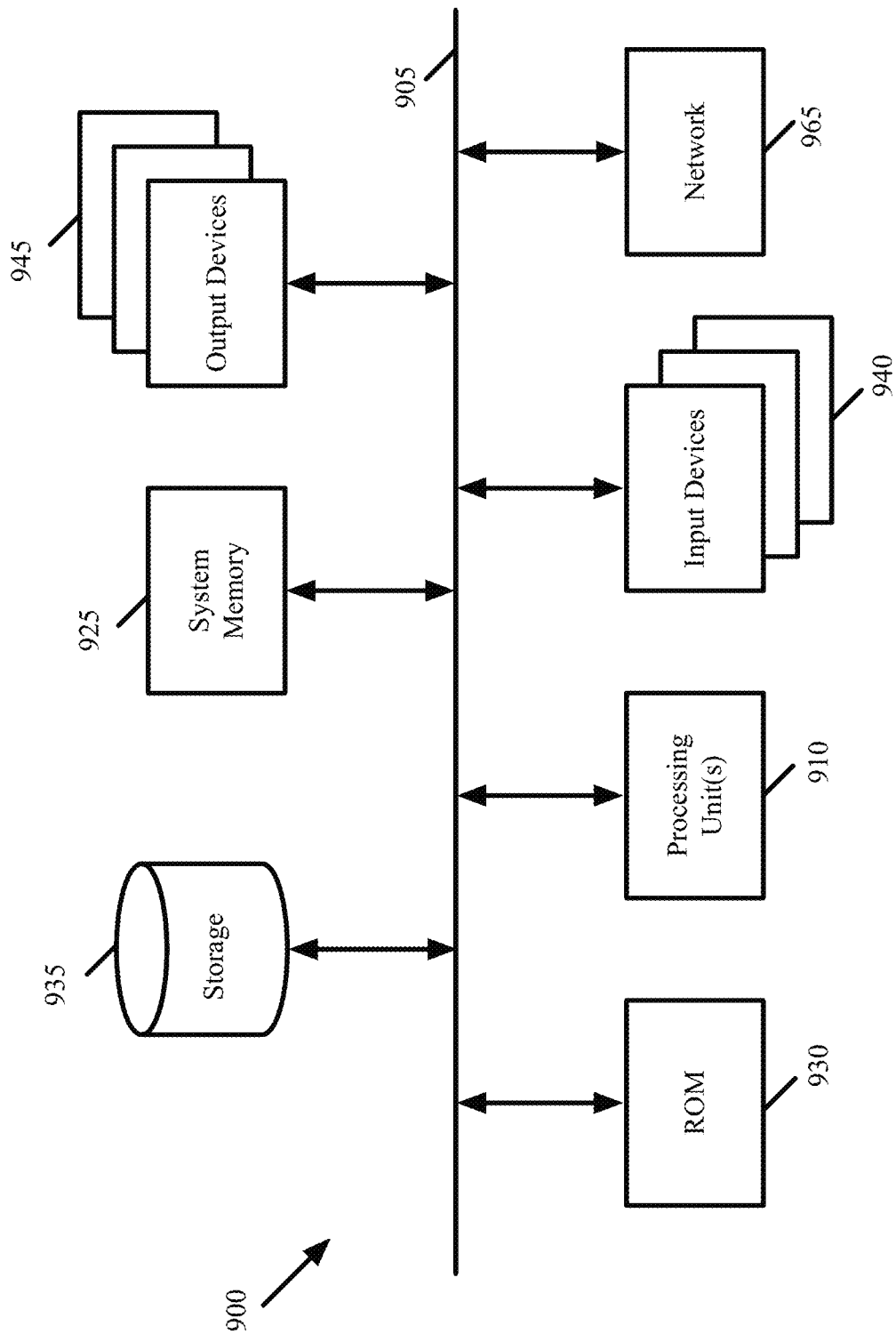
FIG. 9 conceptually illustrates a computer system with which some embodiments of the invention are implemented.

FIG. 9 conceptually illustrates a computer system 900 with which some embodiments of the invention are implemented. The computer system 900 can be used to implement any of the above-described hosts, controllers, gateway, and edge forwarding elements. As such, it can be used to execute any of the above described processes. This computer system 900 includes various types of non-transitory machine-readable media and interfaces for various other types of machine-readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) 910 may be a single processor or a multi-core processor in different embodiments. The read-only-memory (ROM) 930 stores static data and instructions that are needed by the processing unit(s) 910 and other modules of the computer system 900. The permanent storage device 935, on the other hand, is a read-and-write memory device. This device 935 is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory 925 is a volatile read-and-write memory, such as random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices 940 enable the user to communicate information and select commands to the computer system 900. The input devices 940 include alphanumeric keyboards and pointing devices (also called "cursor control devices"). The output devices 945 display images generated by the computer system 900. The output devices 945 include printers and display devices, such as cathode ray tubes (CRT) or liquid crystal displays (LCD). Some embodiments include devices such as touchscreens that function as both input and output devices 940 and 945.

Finally, as shown in FIG. 9, bus 905 also couples computer system 900 to a network 965 through a network adapter (not shown). In this manner, the computer 900 can be a part of a network of computers (such as a local area network ("LAN"), a wide area network ("WAN"), or an Intranet), or a network of networks (such as the Internet). Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2, 5, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method of sending data messages from an edge router at a first location of an enterprise network to a Saas (software as a service) application server provided by a third-party at a second location, the method comprising:
    receiving, from a DNS (domain name system) first server, a resolution for a particular destination network address for the SaaS application server at the second location;
    from a second server, obtaining an identifier for a first cloud gateway from a plurality of cloud gateways at a plurality of locations through which the particular destination address for the SaaS application server can be reached, the first cloud gateway farther from the first location than a second cloud gateway in the plurality of cloud gateways but closer to the second location than the second cloud gateway; and
    using an optimized SD-WAN connection to the first cloud gateway using at least a set of latency scores to forward data messages for the first cloud gateway to the SaaS application at the second location, the set of latency scores being determined by the edge router links between the edge router and the plurality of cloud gateways, the set of latency scores comprising a first latency score for a link between the edge router and the first cloud gateway and a second latency score for a link between the first cloud gateway and the SaaS application server.

2. The method of claim 1, wherein:
    a first round-trip time (RTT) associated with using the first cloud gateway is longer than a second RTT associated with using the second cloud gateway; and
    the first RTT is longer than the second RTT as a result of the first cloud gateway being farther from the first location than the second cloud gateway.

3. The method of claim 1, wherein receiving, from the second server the identifier for the first cloud gateway further comprises receiving, from the second server, location information and the set of latency scores associated with the first cloud gateway.

4. The method of claim 3, wherein the set of latency scores comprises a first latency score associated with a first link between the edge router and the first cloud gateway and a second latency score associated with a second link between the first cloud gateway and the SaaS application server.

5. The method of claim 4, wherein:
the set of latency scores is a first set of latency scores;
the second cloud gateway is associated with a second set of latency scores comprising a third latency score associated with a third link between the edge router and the second cloud gateway and a fourth latency score associated with a fourth link between the second cloud gateway and the SaaS application server;
the first latency score associated with the first link between the edge router and the first cloud gateway and the fourth latency score associated with the fourth link between the second cloud gateway and the SaaS application server comprise high latency scores; and
the second latency score associated with the second link between the first cloud gateway and the SaaS application server and the third latency score associated with the third link between the edge router and the second cloud gateway comprise low latency scores.

6. The method of claim 5, wherein:
the SaaS application server is associated with a low latency requirement;
the fourth latency score associated with the fourth link between the second cloud gateway and the SaaS application server exceeds a threshold specified by the low latency requirement for the SaaS application server; and
the second latency score associated with the second link between the first cloud gateway and the SaaS application server does not exceed the threshold specified by the low latency requirement for the SaaS application server.

7. The method of claim 1, wherein the second server comprises a management and control server.

8. The method of claim 1, wherein the second server collects metrics from the plurality of cloud gateways, and uses the collected metrics to identify the first cloud gateway as a most optimal cloud gateway for use by the edge router at the first location to forward data messages to the SaaS application server at the second location.

9. The method of claim 8, wherein the SaaS application server is a first SaaS application server, wherein the management and control server provides an identifier for the second cloud gateway for use by the edge router at the first location to send data messages to a second SaaS application server at a third location.

10. The method of claim 1, wherein prior to receiving the identifier for the first cloud gateway, the second cloud gateway is assigned to the edge router as a default cloud gateway for sending data messages to the SaaS application server.

11. A non-transitory machine readable medium storing a program for execution by a set of processing units, the program for sending data messages from an edge router at a first location of an enterprise network to a SaaS (software as a service) application server provided by a third-party at a second location, the program comprising sets of instructions for:
receiving, from a DNS (domain name system) first server, a resolution for a particular destination network address for the SaaS application server at the second location;
from a second server, obtaining an identifier for a first cloud gateway from a plurality of cloud gateways at a plurality of locations through which the particular destination address for the SaaS application server can be reached, the first cloud gateway farther from the first location than a second cloud gateway in the plurality of cloud gateways but closer to the second location than the second cloud gateway; and
using an optimized SD-WAN connection to the first cloud gateway using at least a set of latency scores to forward data messages for the first cloud gateway to the SaaS application at the second location, the set of latency scores being determined by the edge router links between the edge router and the plurality of cloud gateways, the set of latency scores comprising a first latency score for a link between the edge router and the first cloud gateway and a second latency score for a link between the first cloud gateway and the SaaS application server.

12. The non-transitory machine readable medium of claim 11, wherein:
a first round-trip time (RTT) associated with using the first cloud gateway is longer than a second RTT associated with using the second cloud gateway; and
the first RTT is longer than the second RTT as a result of the first cloud gateway being farther from the first location than the second cloud gateway.

13. The non-transitory machine readable medium of claim 11, wherein the set of instructions for receiving, from the second server the identifier for the first cloud gateway further comprises a set of instructions for receiving, from the second server, location information and the set of latency scores associated with the first cloud gateway.

14. The non-transitory machine readable medium of claim 13, wherein the set of latency scores comprises a first latency score associated with a first link between the edge router and the first cloud gateway and a second latency score associated with a second link between the first cloud gateway and the SaaS application server.

15. The non-transitory machine readable medium of claim 14, wherein:
the set of latency scores is a first set of latency scores;
the second cloud gateway is associated with a second set of latency scores comprising a third latency score associated with a third link between the edge router and the second cloud gateway and a fourth latency score associated with a fourth link between the second cloud gateway and the SaaS application server;
the first latency score associated with the first link between the edge router and the first cloud gateway and the fourth latency score associated with the fourth link between the second cloud gateway and the SaaS application server comprise high latency scores; and
the second latency score associated with the second link between the first cloud gateway and the SaaS application server and the third latency score associated with the third link between the edge router and the second cloud gateway comprise low latency scores.

16. The non-transitory machine readable medium of claim 15, wherein:
the SaaS application server is associated with a low latency requirement;
the fourth latency score associated with the fourth link between the second cloud gateway and the SaaS application server exceeds a threshold specified by the low latency requirement for the SaaS application server; and
the second latency score associated with the second link between the first cloud gateway and the SaaS application server does not exceed the threshold specified by the low latency requirement for the SaaS application server.

17. The non-transitory machine readable medium of claim 11, wherein the second server comprises a management and control server.

18. The non-transitory machine readable medium of claim 11, wherein the second server collects metrics from the plurality of cloud gateways, and uses the collected metrics to identify the first cloud gateway as a most optimal cloud gateway for use by the edge router at the first location to forward data messages to the SaaS application server at the second location.

19. The non-transitory machine readable medium of claim 18, wherein the SaaS application server is a first SaaS application server, wherein the management and control server provides an identifier for the second cloud gateway for use by the edge router at the first location to send data messages to a second SaaS application server at a third location.

20. The non-transitory machine readable medium of claim 11, wherein prior to receiving the identifier for the first cloud gateway, the second cloud gateway is assigned to the edge router as a default cloud gateway for sending data messages to the SaaS application server.

* * * * *